United States Patent
Jang

(10) Patent No.: US 12,499,026 B2
(45) Date of Patent: Dec. 16, 2025

(54) STORAGE DEVICE AND THROTTLING OPERATION METHOD THEREOF

(71) Applicant: SK hynix Inc., Gyeonggi-do (KR)

(72) Inventor: In Jong Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/325,130

(22) Filed: May 30, 2023

(65) Prior Publication Data
US 2024/0184679 A1  Jun. 6, 2024

(30) Foreign Application Priority Data

Dec. 2, 2022 (KR) .................... 10-2022-0166871

(51) Int. Cl.
G06F 11/30 (2006.01)
G06F 11/07 (2006.01)
G06F 11/14 (2006.01)

(52) U.S. Cl.
CPC ...... G06F 11/3037 (2013.01); G06F 11/0793 (2013.01); G06F 11/1441 (2013.01)

(58) Field of Classification Search
CPC ............ G06F 11/0793; G06F 11/1441; G06F 11/3037
See application file for complete search history.

(56) References Cited

U.S. PATENT DOCUMENTS

| | | |
|---|---|---|
| 2014/0101371 A1 | 4/2014 | Nguyen et al. |
| 2017/0249091 A1 | 8/2017 | Hodes et al. |
| 2017/0351308 A1* | 12/2017 | Rangarajan ............ G11C 7/04 |
| 2021/0216216 A1* | 7/2021 | Brandt ................. G06F 3/0653 |
| 2021/0326059 A1* | 10/2021 | Kim ..................... G06F 3/0659 |
| 2022/0147126 A1* | 5/2022 | Chin ...................... G06F 1/206 |
| 2022/0293184 A1* | 9/2022 | Shukla .............. G11C 16/3418 |
| 2024/0094920 A1* | 3/2024 | Nayak ................ G06F 11/0772 |

* cited by examiner

Primary Examiner — Jigar P Patel
(74) Attorney, Agent, or Firm — IP & T GROUP LLP

(57) ABSTRACT

The present disclosure relates to an operation method of a storage device, which is for overcoming the instability of the storage device caused by throttling cancellation. An operation method of a memory controller may include: acquiring a temperature of a memory; determining, on the basis of the temperature of the memory, to start a throttling operation that reduces performance of the memory; determining whether the throttling operation is cancelled; and recovering the throttling operation, which alleviates instability of the memory caused by the throttling cancellation.

20 Claims, 10 Drawing Sheets

STORAGE DEVICE AND THROTTLING OPERATION METHOD THEREOF

CROSS-REFERENCE TO RELATED APPLICATIONS

The present application claims priority to Korea Patent Application No. 10-2022-0166871, filed Dec. 2, 2022, the entire disclosure of which is incorporated herein by reference for all purposes.

BACKGROUND

Field

Various embodiments of the present disclosure relate to a throttling operation of a storage device and more particularly to an operation method of a storage device, which is for overcoming the instability of the storage device caused by throttling cancellation.

Description of the Related Art

A storage device is capable of storing data on the basis of a request from a computer, a mobile terminal such as a smartphone or a tablet, or an external device such as various electronic devices.

The storage device may include a memory and a memory controller for controlling the memory. The memory controller may receive a command from an external device, may read data from the memory on the basis of the received command, may write/program data to the memory, or may perform or control operations for erasing the data of the memory.

As data throughput and a data processing speed increase, the storage device consumes more power and thus may operate at significantly higher temperatures.

Since the storage device may be damaged and malfunction while operating at a high temperature, a throttling function for adjusting the performance of the storage device is used.

Throttling is a function that, when the temperature of the storage device rises above a set temperature, prevents the storage device from rising above the set temperature or lowers the temperature by performing an operation capable of reducing the performance of an electronic device (e.g., by using a slow operation clock).

However, if a hibernation operation or a reset operation occurs before a throttling operation is started or before the temperature of the storage device is sufficiently reduced by starting the throttling operation, the throttling operation may be cancelled and normal operations can be performed. Then, the storage device can operate at the maximum clock speed of the normal operation. This applies stress to the storage device so that the normal operation of the storage device cannot be guaranteed and the possibility of malfunction may increase.

SUMMARY

The purpose of various embodiments of the present disclosure is to provide various methods for preventing the cancellation of the throttling operation by generating a hibernation operation or a reset operation during the throttling operation.

The technical problem to be overcome by the present invention is not limited to the above-mentioned technical problems. Other technical problems not mentioned can be clearly understood from the embodiments of the present invention by a person having ordinary skill in the art.

An embodiment of the present disclosure is an operation method of a memory controller. The operation method may include: acquiring a temperature of a memory; determining, on the basis of the temperature of the memory, to start a throttling operation that reduces performance of the memory; determining whether the throttling operation is cancelled; and performing a throttling recovery operation, which alleviates instability of the memory caused by cancelling the throttling operation.

Another embodiment of the present disclosure is a memory controller including: a temperature acquirer configured to acquire a temperature of a memory; a throttling counter configured to increase by 1 each time a determination to start a throttling operation that reduces performance of the memory is made; a throttling cancellation counter configured to increase by 1 each time the throttling operation is cancelled; and a manager configured to determine to start the throttling operation and control performing a throttling recovery operation that alleviates instability of the memory caused by cancelling the throttling operation on the basis of the temperature of the memory, a value of the throttling counter, and a value of the throttling cancellation counter.

Further another embodiment of the present disclosure is a storage device including: a memory equipped with a temperature sensor; and a memory controller configured to: determine, on the basis of a temperature of the memory, to start a throttling operation that reduces performance of the memory and perform the throttling recovery operation that alleviates instability of the memory caused by cancellation of the throttling operation.

DETAILED DESCRIPTION

Hereinafter, embodiments of the present disclosure will be described in detail with reference to the accompanying drawings.

Figure 1:
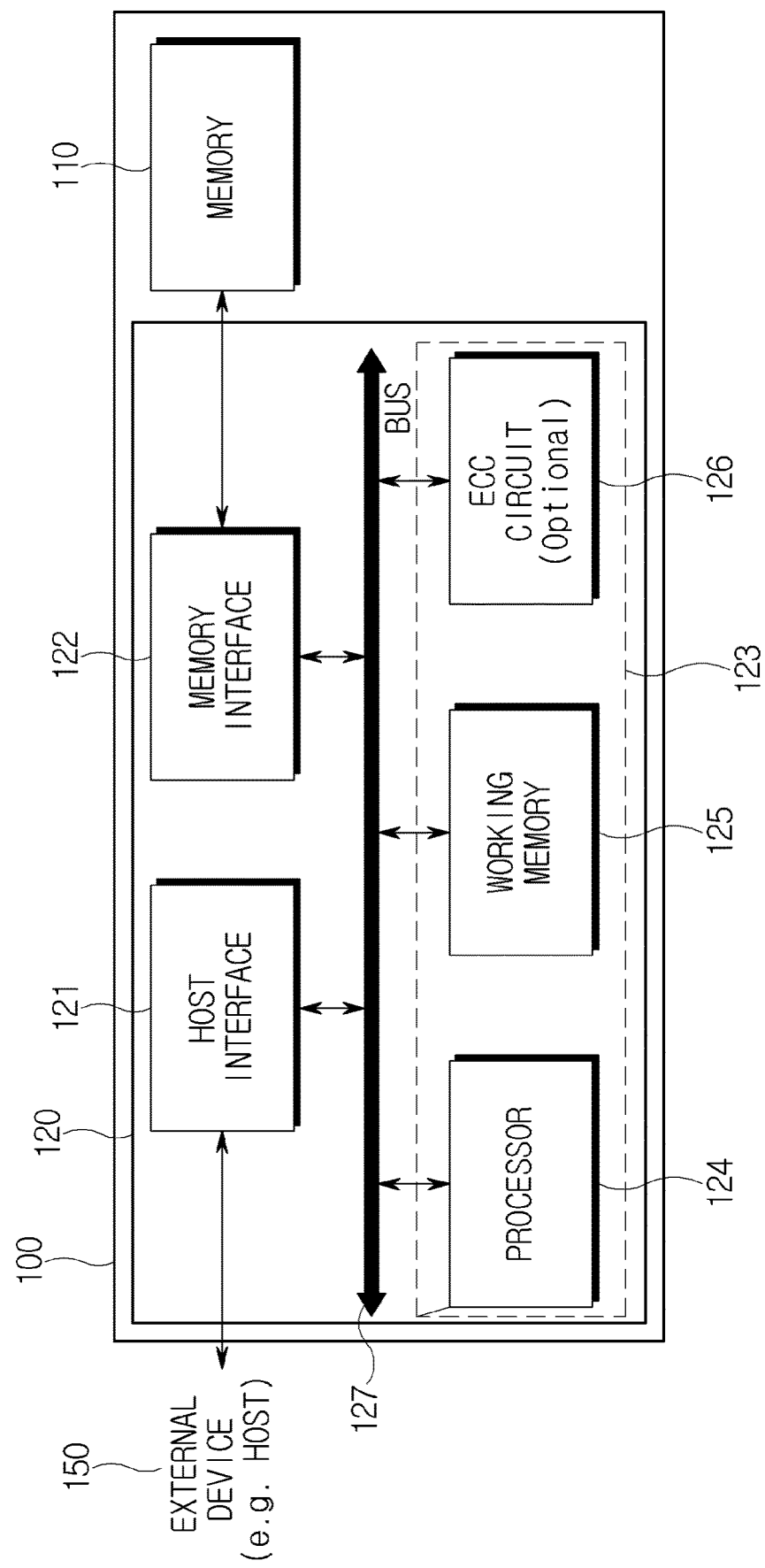
FIG. 1 is a view showing schematically a configuration of a storage device according to various embodiments of the present disclosure.

FIG. 1 is a view showing schematically a configuration of a storage device 100 according to various embodiments of the present disclosure.

Referring to FIG. 1, the storage device 100 according to the embodiments of the present disclosure may include a memory 110 that stores data and a controller 120 that controls the memory 110. If necessary, additional components may be further included in the storage device 100.

The memory 110 operates in response to the control of the controller 120. Here, the operation of the memory 110 may include, for example, a read operation, a program operation (also referred to as "write operation"), and an erase operation.

For example, the memory 110 may include various types of non volatile memory such as a NAND flash memory, a 3D NAND flash memory, a NOR flash memory, a resistive random-access memory (RRAM), a Phase-Change Memory (PRAM), a magneto-resistive random-access memory (MRAM), a ferroelectric random-access memory (FRAM), or a spin transfer torque random access memory (STT-RAM) and the like.

Moreover, the memory 110 may be implemented to have a three-dimensional array structure. The embodiments of the present disclosure can be applied not only to a flash memory in which a charge storage layer is composed of a conductive floating gate, but also to a charge trap type flash (CTF) in which the charge storage layer is composed of an insulation layer.

The memory 110 may receive commands and addresses from the controller 120 (also referred to as a memory controller) and may access an area in a memory cell array selected by an address. That is, the memory 110 may perform an operation indicated by a command with respect to the area selected by the address.

For example, the memory 110 may perform a program operation, a read operation, and an erase operation. During the program operation, the memory 110 may program data in the area selected by the address. During the read operation, the memory 110 may read data from the area selected by the address. During the erase operation, the memory 110 may erase data stored in the area selected by the address.

The controller 120 may control the program (write), read, erase, and background operations on the memory 110. Here, the background operation may include one or more of garbage collection (GC), wear leveling (WL), read reclaim (RR), or bad block management (BBM) operations.

The controller 120 may control the operation of the memory 110 in accordance with a request from an external device (e.g., a host HOST) located outside the storage device 100. Also, the controller 120 may control the operation of the memory 110 regardless of the request from the external device.

The external device may include a computer, an ultra-mobile PCs (UMPCs), a workstation, a personal digital assistant (PDAs), a tablet PC, a mobile phone, a smart phone, an e-book, a portable multimedia player (PMP), a portable game machine, a navigation system, a black box, a digital camera, a digital multimedia broadcasting (DMB) player, a smart television, a digital audio recorder, a digital audio player, a digital picture recorder, a digital picture player, a digital video recorder, a digital video player, a storage forming a data center, one of various electronic devices constituting a home network, one of various electronic devices constituting a computer network, one of various electronic devices constituting a telematics network, a radio frequency identification (RFID) device, or a mobile device (e.g., a vehicle, a robot, a drone) that travels on the ground, in the water or in the air under human control or autonomously.

The external device may include at least one operating system (OS). The operating system can manage and control overall functions and operations of the external device, and can provide mutual operations between the external device and the storage device 100. The operating system may be divided into a general operating system and a mobile operating system, depending on the mobility of external devices.

Meanwhile, the controller 120 and the external device may be separated from each other. In some cases, the controller 120 and the external device may be implemented as one integrated device. Hereinafter, for convenience of description, an example will be described in which the controller 120 and the external device are separated from each other.

Referring to FIG. 1, the controller 120 may include a host interface 121, a memory interface 122, a control circuit 123, and the like.

The host interface 121 provides an interface for communicating with the external device. For example, the host interface 121 may provide an interface that uses at least one of various communication standards or interfaces such as a universal serial bus (USB) protocol, a multimedia card (MMC) protocol, a peripheral component interconnection (PCI) protocol, a PCI-express (PCI-E) protocol, an advanced technology attachment (ATA) protocol, Serial-ATA protocol, a Parallel-ATA protocol, a small computer small interface (SCSI) protocol, an enhanced small disk interface (ESDI) protocol, an integrated drive electronics (IDE) protocol, a system management bus (SMBus) protocol, an inter-integrated circuit (I2C) protocol, an improved inter-integrated circuit (I3C) protocol, a proprietary protocol, etc.

The control circuit 123 may receive a command through the host interface 121 and may perform an operation of processing the received command.

The memory interface 122 may be connected to the memory 110 to provide an interface for communicating with the memory 110. That is, the memory interface 122 may be configured to provide an interface between the memory 110 and the controller 120 in response to control of the control circuit 123.

The control circuit 123 may control the operation of the memory 110 by performing overall control operations of the controller 120. To this end, according to the embodiment, the control circuit 123 may include a processor 124, and additionally may selectively include a working memory 125 and/or an error detection and correction circuit (ECC) 126.

The processor 124 may control overall operations of the controller 120.

The processor 124 may communicate with the external device through the host interface 121 and may communicate with the memory 110 through the memory interface 122.

The processor 124 may perform a function of a flash translation layer (FTL). The processor 124 may convert a logical block address provided by the external device into a physical block address through the flash translation layer (FTL). Through use of a mapping table, the flash translation layer may receive a logical block address and may convert the logical block address into a physical block address.

There are various address mapping methods of the flash translation layer depending on a mapping unit. Representative address mapping methods include a page mapping method, a block mapping method, and a hybrid mapping method.

The processor 124 may randomize data received from the external device. For example, the processor 124 may randomize data received from the external device by using a set randomizing seed. The randomized data may be provided to the memory 110 and programmed into the memory 110.

The processor 124 may de-randomize the data received from the memory 110 during the read operation. For example, the processor 124 may de-randomize the data received from the memory 110 by using a de-randomizing seed. The de-randomized data may be output to the external device.

The processor 124 may perform background functions for the memory 110 such as a garbage collection (GC) function, a wear leveling (WL) function, and a bad block management function.

In order to secure a free space to which data is written when there is not enough space in which data is written in the memory 110, the garbage collection function may collect data partially written in an existing memory block and move the data to another memory block.

In order to prevent errors and data loss of the memory 110 in advance and to improve the durability and stability of a product, the wear leveling function prevents the excessive use of a specific block by evenly writing data to all memory blocks of the memory 110.

The bad block management function may detect a bad block within the memory 110 and replace the bad block with a spare block when there is the spare block, so that data is prevented from being written to the bad block.

The processor 124 may control the operation of the controller 120 by executing firmware. That is, the processor 124 may control overall operations of the controller 120 and may execute (drive) firmware stored in the working memory 125 during booting. Hereinafter, the operation of the storage device 100 described in the embodiments of the present disclosure may be implemented in such a manner that the processor 124 executes firmware in which corresponding operations are defined.

The firmware is a program which is executed in the storage device 100 in order to drive the storage device 100 and may include various functional layers. For example, the firmware may include binary data in which codes for executing each of the aforementioned functional layers are defined.

For example, the firmware includes the flash translation layer, a host interface layer (HIL), and a flash interface layer (FIL). The flash translation layer performs a translation function between the logical block address transmitted from the external device to the storage device 100 and the physical block address of the memory 110. The host interface layer interprets the command received from the external device through the host interface 121 and transmits it to the flash translation layer. The flash interface layer transmits the command instructed by the flash translation layer to the memory 110.

Also, the firmware may include the garbage collection function, the wear leveling function, and the bad block management function.

Such firmware may be, for example, loaded into the working memory 125 from the memory 110 or a separate non-volatile memory (e.g., ROM, NOR Flash) located outside the memory 110. When executing booting after power-on, the processor 124 may first load all or part of the firmware into the working memory 125.

The processor 124 may perform a logic operation defined in the firmware loaded into the working memory 125 in order to control the overall operation of the controller 120. The processor 124 may store a result of performing the logic operation defined in the firmware in the working memory 125. The processor 124 may control the controller 120 to generate a command or signal in accordance with the result of performing the logic operation defined in the firmware. When the part of the firmware in which the logic operation to be performed is defined is not loaded into the working memory 125, the processor 124 may generate an event (e.g., interrupt) for loading the corresponding part of the firmware into the working memory 125.

Meanwhile, the processor 124 may load, from the memory 110, meta data required to drive the firmware. The meta data is for managing the memory 110 and may include management information on user data stored in the memory 110.

Meanwhile, the firmware may be updated while the storage device 100 is being produced or while the storage device 100 is running. The controller 120 may download new firmware from the outside of the storage device 100 and may update the existing firmware to the new firmware.

The working memory 125 may store firmware, program codes, commands, or data required to drive the controller 120. The working memory 125 may include, for example, a volatile memory such as one or more of a static RAM (SRAM), a dynamic RAM (DRAM), and a synchronous DRAM (SDRAM).

The error detection and correction circuit 126 may detect an error bit of a target data by using an error correction code and may correct the detected error bit. Here, the target data may be, for example, data stored in the working memory 125 or data read from the memory 110.

The error detection and correction circuit 126 may be implemented to decode data with the error correction code. The error detection and correction circuit 126 may be implemented with a variety of decoders. For example, a decoder that performs non-systematic decoding or a decoder that performs systematic decoding may be used.

For example, the error detection and correction circuit 126 may detect an error bit in units of sectors set for each read data. That is, each read data may be composed of a plurality of sectors. The sector may refer to a data unit smaller than a page that is a read unit of a flash memory. The sectors constituting each read data may correspond to each other through the medium of an address.

The error detection and correction circuit 126 may calculate a bit error rate (BER) and may determine whether correction is possible in units of a sectors. For example, the error detection and correction circuit 126 may determine that a corresponding sector is uncorrectable or fail when the bit error rate (BER) is higher than a preset reference value. On the other hand, if the bit error rate (BER) is lower than the reference value, the error detection and correction circuit 126 may determine that the corresponding sector is correctable or pass.

The error detection and correction circuit 126 may sequentially perform error detection and correction operation on all read data. When the sector included in the read data is correctable, the error detection and correction circuit 126 may omit the error detection and correction operation on the corresponding sector in the next read data. When the error detection and correction operations on all read data are completed in this way, the error detection and correction circuit 126 may detect sectors that are determined to be uncorrectable until the end of the data. There may be one or more sectors determined to be uncorrectable. The error detection and correction circuit 126 may transmit information (e.g., address information) on the sector determined to be uncorrectable to the processor 124.

A bus 127 may be configured to provide a channel between the components 121, 122, 124, 125, and 126 of the controller 120. Such a bus 127 may include, for example, a control bus for transmitting various control signals, commands, and the like, and a data bus for transmitting various data.

Furthermore, some of the aforementioned components 121, 122, 124, 125, and 126 of the controller 120 may be removed, or some of the aforementioned components 121, 122, 124, 125, and 126 of the controller 120 may be integrated into one. In some cases, in addition to the above-described components of the controller 120, one or more other components may be added.

Figure 2:
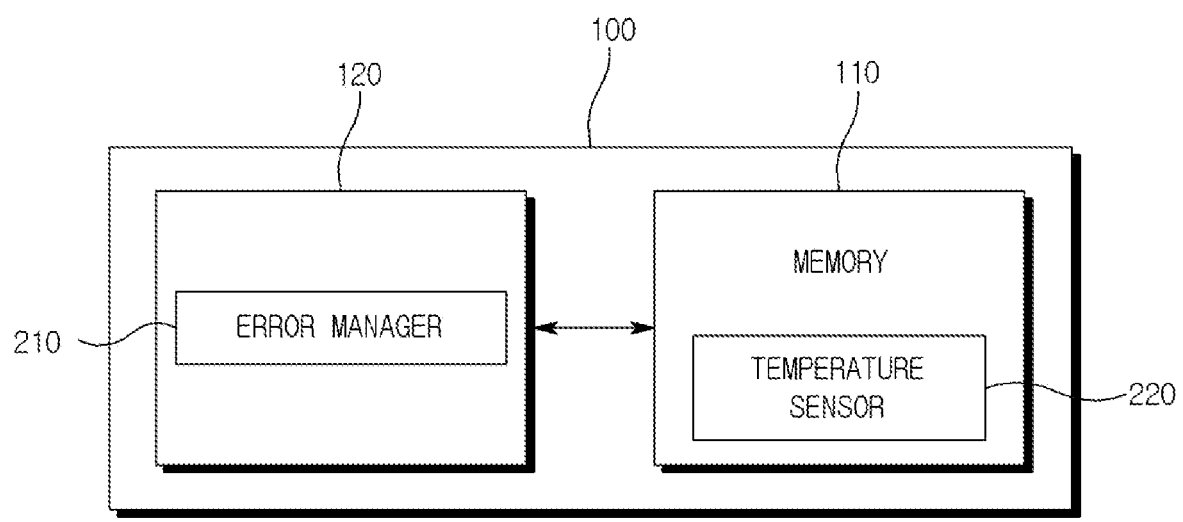
FIG. 2 is a view for describing an error manager of the storage device according to various embodiments of the present disclosure.

FIG. 2 is a view for describing an error manager of the storage device according to various embodiments of the present disclosure.

Referring to FIG. 2, the controller 120 may include an error manager 210. The error manager 210 may be a module of the storage device 100 that performs control for suppressing the occurrence of errors due to overheating of the memory 110. According to the embodiment, the error manager 210 may be a software module executed by the processor 124.

The memory 110 may include a temperature sensor 220 capable of measuring the temperature of the memory 110. As the amount of data processed by the storage device 100 increases, power consumption increases, and as a result, a heating value of the memory 110 may increase. The temperature sensor 220 may measure the temperature of the memory 110 and provide the measured temperature to the controller 120.

The error manager 210 of the controller 120 may perform control for suppressing an operation error of the storage device 100 on the basis of a temperature measurement result obtained from the temperature sensor 220.

According to the embodiment, the error manager 210 may perform an operation for suppressing an increase in temperature of the memory 110. When the temperature of the memory 110 rises above a predetermined temperature, errors in the control operation of the memory 110 of the controller 120 may increase. Accordingly, the error manager 210 may perform control for preventing the temperature of the memory 110 from rising above the predetermined temperature or of lowering the temperature of the memory 110.

Figure 3:
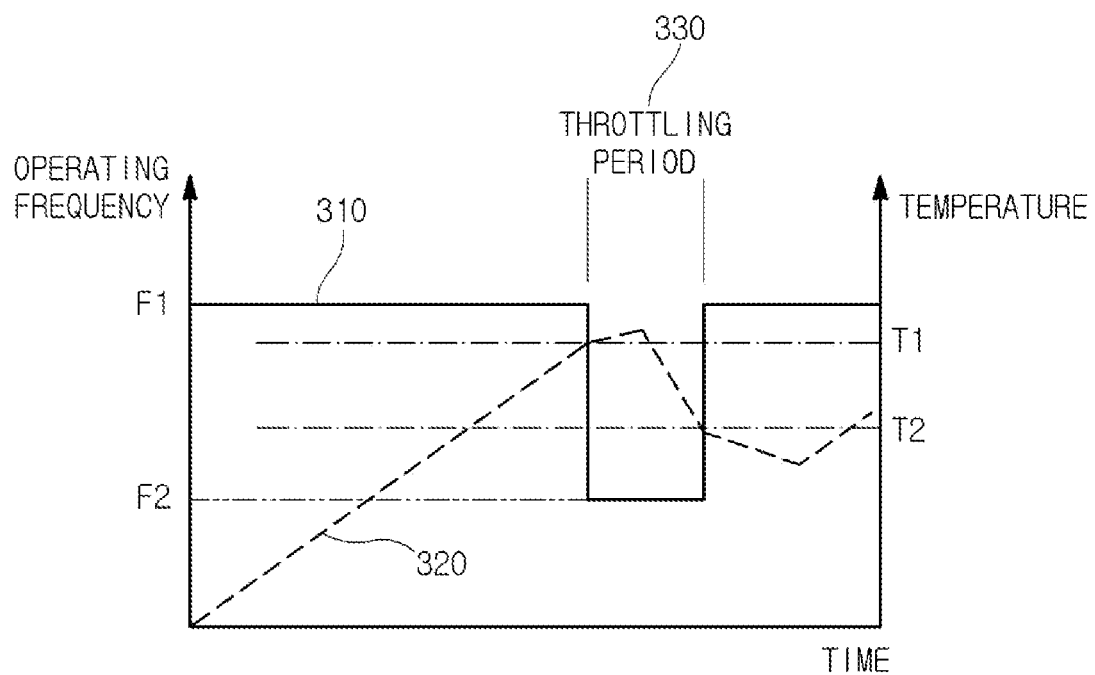
FIG. 3 is a view showing an example of an operation of the error manager according to a temperature of a memory according to various embodiments of the present disclosure.

FIG. 3 is a view showing an example of an operation of the error manager 210 according to the temperature of the memory 110 according to various embodiments of the present disclosure.

Referring to FIG. 3, the controller 120 of the storage device 100 may set an operating frequency (clock frequency or clock speed) 310 that is used to operate the memory 110. The higher the operating frequency 310 is, the faster the memory 110 operates, and reading data from the memory 110 or writing data to the memory 110 can be performed faster. That is, it can be said that the higher the operating frequency 310 is, the higher the performance of the memory 110 is.

The controller 120 of the storage device 100 may set the operating frequency 310 of the memory 110 in a normal state to F1. According to the embodiment, F1 may be the highest frequency capable of operating the memory 110.

As the memory 110 continues to operate at the operating frequency of F1, a temperature 320 of the memory 110 may increase. When the temperature 320 of the memory 110 reaches T1, the error manager 210 determines that an error is highly likely to occur when reading data from the memory 110 or programming data into the memory 110, and then may perform control for lowering the temperature of the memory 110. Accordingly, the error manager 210 may perform a throttling operation. The throttling operation may reduce the performance of the memory 110. According to the embodiment, the error manager 210 may reduce the performance of the memory 110 while reducing the operating frequency 310 of the memory 110 from F1 to F2.

As shown in FIG. 3, when the operating frequency 310 of the memory 110 is reduced from F1 to F2, the temperature 320 of the memory 110 may be maintained or decreased. In addition, when the temperature 320 of the memory 110 decreases and reaches T2, the operating frequency 310 of the memory 110 is reset to F1, so that the memory 110 operates with the highest performance.

A throttling period 330 may be generated, in which the performance of the memory 110 is reduced by the operation of the above-described error manager 210.

Although the example of FIG. 3 shows only two-step temperature management, it is a well-known fact that three step, four step, or multiple step temperature management is possible according to another embodiment.

Also, although the example of FIG. 3 shows only the operation at a high temperature, a similar operation can be performed even at a low temperature. For example, the throttling operation may be started when the temperature of the memory 110 becomes lower than T3, and the throttling operation may be ended when the temperature of the memory 110 becomes higher than T4 which is higher than T3.

Figure 4:
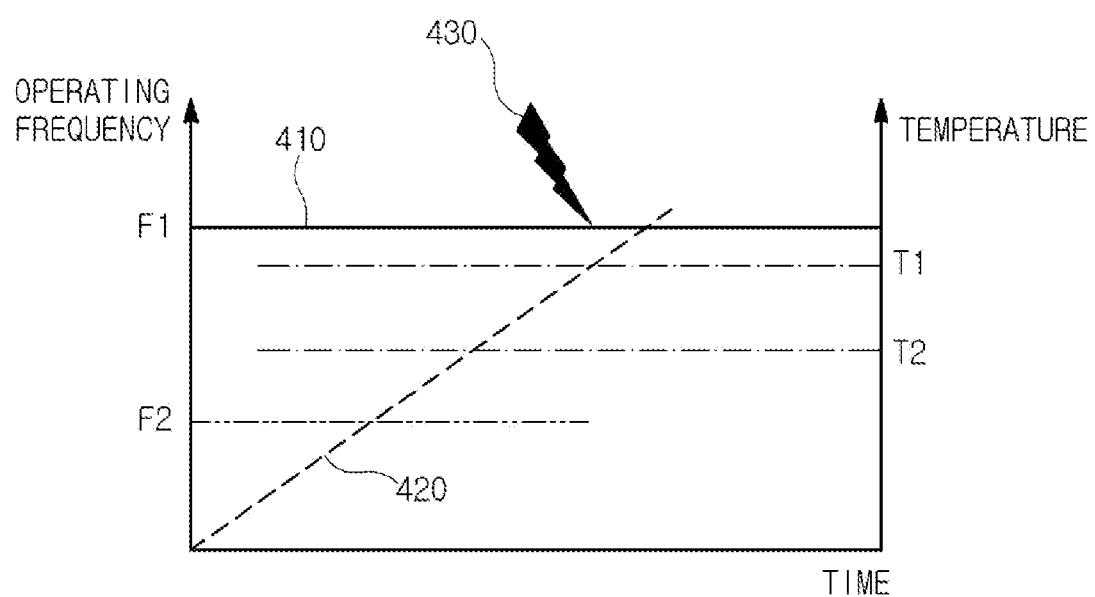
FIG. 4 is a view showing an example of an operation of a case where a throttling operation is cancelled according to various embodiments of the present disclosure.

FIG. 4 is a view showing an example of an operation of a case where the throttling operation is cancelled according to various embodiments of the present disclosure.

Referring to FIG. 4, if a reset operation 430 occurs or a hibernation operation occurs when the error manager 210 determines and starts the throttling operation, the throttling operation is cancelled and cannot be performed, and the original normal operation can be performed. In this case, since the memory is operated again at its operating frequency 410 of F1 for the maximum performance while a temperature 420 of the memory 110 is not reduced, the temperature 420 of the memory 110 can be increased again and the memory 110 is stressed, and thus, the normal operation of the memory 110 may not be guaranteed.

According to another embodiment, when the reset operation 430 occurs, the memory is in a poor condition where the temperature 420 of the memory is higher than the predetermined temperature T1, and thus, booting may fail due to the reset operation.

In order to suppress the situation where the memory 110 is stressed and has instability by preventing the situation shown in FIG. 4 from occurring, the present disclosure proposes that the controller 120 executes various throttling recovery operations, which, when the throttling operation is cancelled, alleviates the instability of the memory caused by cancelling the throttling operation. The throttling recovery operation may include an operation of suppressing the occurrence of the throttling cancellation.

Figure 5:
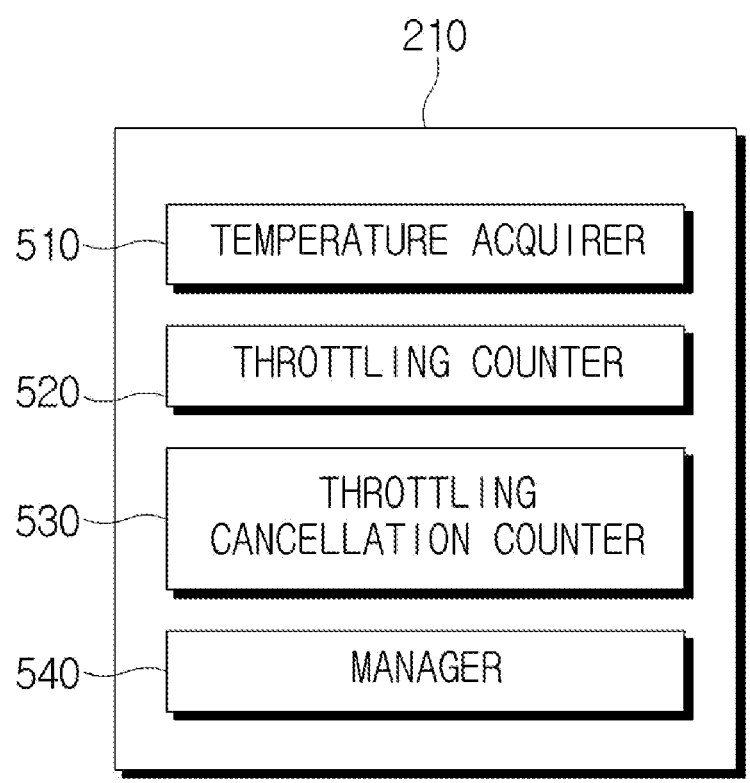
FIG. 5 is a view showing a detailed configuration of the error manager according to various embodiments of the present disclosure.

FIG. 5 is a view showing a detailed configuration of the error manager according to various embodiments of the present disclosure.

Referring to FIG. 5, the error manager 210 may include a temperature acquirer 510, a throttling counter 520, a throttling cancellation counter 530, and a manager 540.

The temperature acquirer 510 may be a module that acquires the temperature of the memory 110 from the temperature sensor 220 provided in the memory 110.

The throttling counter 520 may show the number of times the throttling operation is performed, which is increased by 1 each time the throttling operation is performed by the error manager 210.

The throttling cancellation counter 530 may indicate the number of cancellations of the throttling operation, which is increased by 1 each time the throttling operation is cancelled by the reset operation or hibernation operation during the throttling operation.

The manager 540 may determine whether to start the throttling operation and perform the throttling operation if determined. Further, on the basis of the temperature of the memory 110 acquired by the temperature acquirer 510 and the values of the throttling counter 520 and the throttling cancellation counter 530, the manager 540 may perform various methods for suppressing a situation where the memory 110 is stressed.

1) First Embodiment

Figure 6:
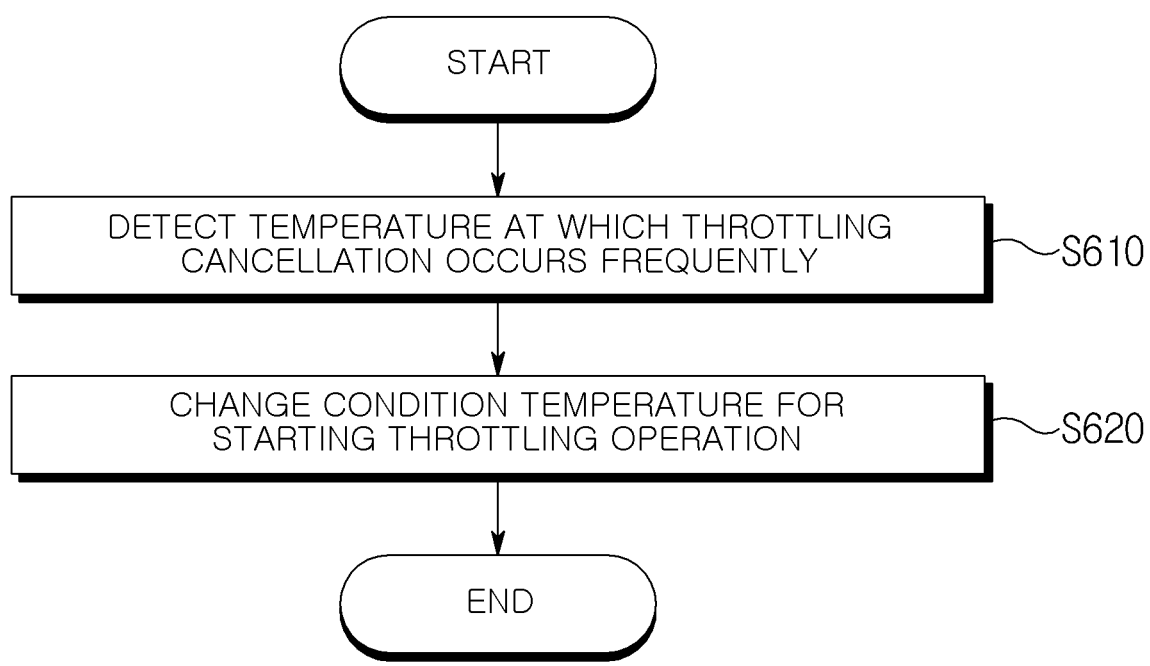
FIG. 6 is a flowchart showing an operation performed by a manager 540 in order to suppress the occurrence of throttling cancellation in accordance with a first embodiment of the present disclosure.

FIG. 6 is a flowchart showing an operation performed by the manager 540 in order to suppress the occurrence of the throttling cancellation in accordance with a first embodiment of the present disclosure.

A factor that makes the operation of the storage device 100 unstable includes a case where the manager 540 determines to perform the throttling operation when throttling conditions for starting the throttling operation are satisfied and the reset operation or hibernation operation is performed before the throttling operation is actually started, and thus, the throttling operation is cancelled. Such unstable factors can be eliminated by causing the throttling operation and either the reset operation or hibernation operation to occur at different points of time.

To this end, referring to FIG. 6, in operation S610, the manager 540 may detect a temperature at which the throttling cancellation occurs frequently.

According to the embodiment, when a ratio of a value of the throttling cancellation counter to a value of the throttling counter becomes larger than a predetermined value (e.g., 0.5), it is determined that the reset operation or hibernation operation frequently occurs at a temperature set currently as a condition for starting the throttling operation. For example, when the temperature (e.g., T1 in FIG. 3) set as the condition for starting the throttling operation is 100 degrees and the ratio of the value of the throttling cancellation counter to the value of the throttling counter is larger than the predetermined value (e.g., 0.5), the temperature (e.g., 100 degrees) set as the condition for starting the throttling operation may be determined as the temperature at which the throttling cancellation occurs frequently.

According to another embodiment, a temperature at which the throttling cancellation occurs frequently may be determined based on the temperature of the memory 110 acquired by the temperature acquirer 510 at the time when the throttling cancellation occurs. According to the embodiment, the temperature at which the throttling cancellation occurs frequently may be determined based on a statistical value of the temperature of the memory 110 at the time when the throttling cancellation occurs. For example, one of a minimum value, an average value, and a median value of the temperature of the memory 110 at the time when the throttling cancellation occurs may be determined as the temperature at which the throttling cancellation occurs frequently.

After the temperature at which the throttling cancellation occurs frequently is determined, the manager 540 may change, in operation S620, a condition temperature for starting the throttling operation. According to the embodiment, in the case of high temperature, the manager 540 sets the condition temperature for starting the throttling operation as a temperature obtained by decreasing the temperature at which the throttling cancellation occurs frequently by a predetermined temperature (e.g., 3 degrees). Alternatively, in the case of low temperature, the manager 540 sets the condition temperature for starting the throttling operation as a temperature obtained by increasing the temperature at which the throttling cancellation occurs frequently by a predetermined temperature (e.g., 3 degrees).

Accordingly, the throttling operation may be started first and the reset operation or hibernation operation may occur after a certain period of time has elapsed. Therefore, it does not occur that the throttling operation is cancelled before the throttling operation is started. Also, after the throttling operation is started and already performed to a certain extent, the reset operation or hibernation operation occurs, so that stable operations are possible.

2) Second Embodiment

Figure 7:
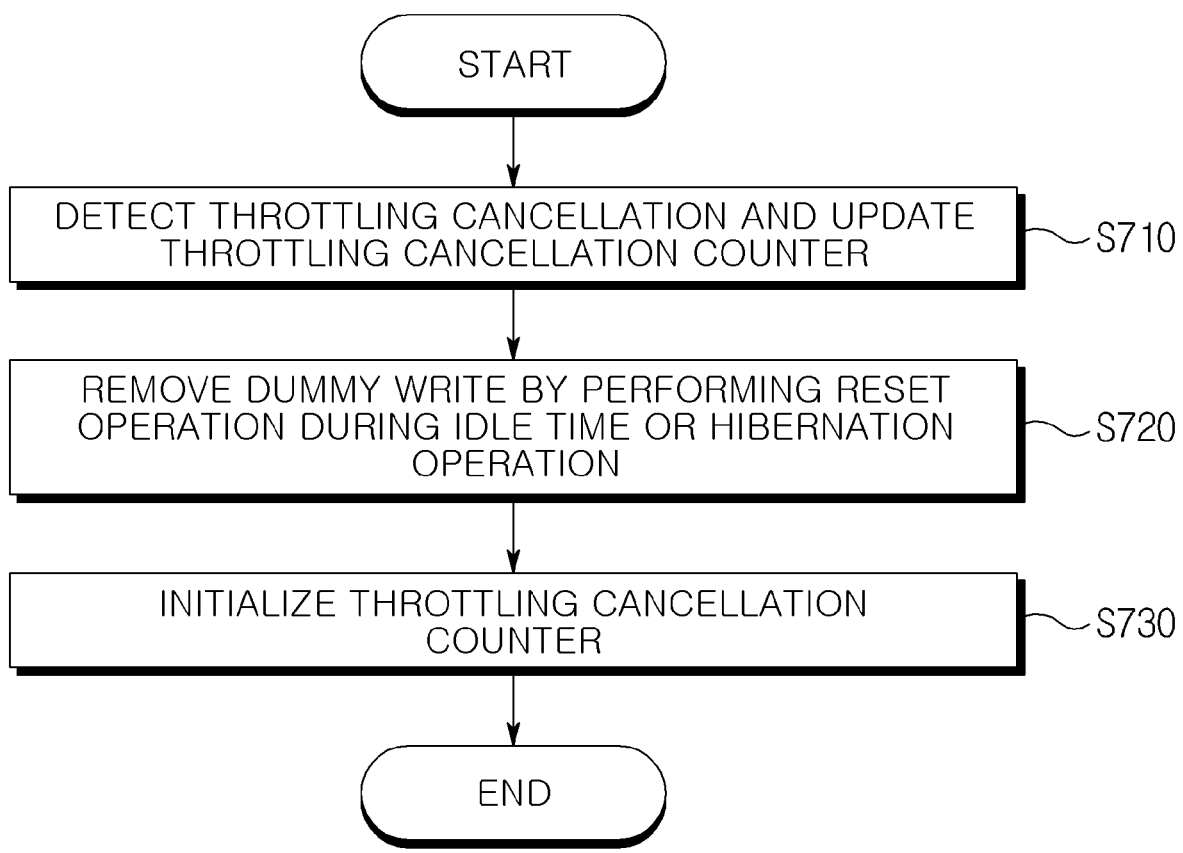
FIG. 7 is a flowchart showing an operation to delete a dummy write which is accumulated by the cancellation of the throttling operation in accordance with a second embodiment of the present disclosure.

FIG. 7 is a flowchart showing an operation to delete a dummy write which is accumulated by the cancellation of the throttling operation in accordance with a second embodiment of the present disclosure.

When a write operation to the memory 110 is buffered in a queue, the throttling operation may be started after all write operations buffered in the corresponding queue are completed or after a current write operation is completed. Therefore, when there is a large amount of data to be written to the memory 110, or when the throttling cancellation by the hibernation operation before the start of the throttling operation occurs frequently due to high temperature during the write operation of the storage device 100, dummy write can be accumulated. Such accumulated dummy writes not only reduce the memory usage rate but also cause an additional delay time in the write operation.

In order to solve this problem, referring to FIG. 7, in operation S710, the manager 540 may detect the throttling cancellation and increase a value of the throttling cancellation counter by 1.

In operation S720, when the value of the throttling cancellation counter becomes larger than a predetermined value, the manager 540 can remove the dummy write by performing a power reset or software reset during an idle time in which there is no operation according to a user command or during the hibernation operation. According to the embodiment, the manager 540 may issue a warning to a user by transmitting, to a first outside, information indicating that the reset operation is to be performed.

Then, in operation S730, the manager 540 may initialize the throttling cancellation counter.

By operations S720 and S730, an internal buffer state or an operating state of the storage device 100 can be restored similarly to a normal operating state.

3) Third Embodiment

Figure 8:
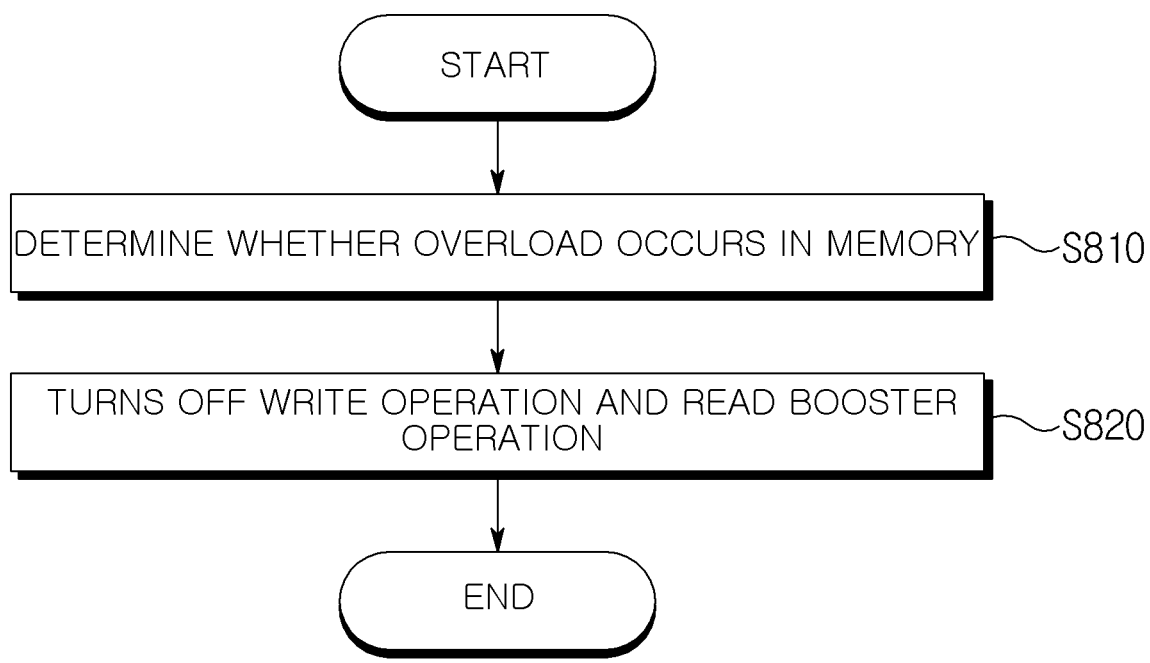
FIG. 8 is a flowchart showing an operation to degrade the performance of the storage device on the basis of determination of whether an overload occurs in accordance with a third embodiment of the present disclosure.

FIG. 8 is a flowchart showing an operation to degrade the performance of the storage device on the basis of determination of whether an overload occurs in accordance with a third embodiment of the present disclosure.

In operation S810, the manager 540 may determine whether an overload occurs in the memory. Here, the overload may mean that there are many write or read operations to or from the memory 110.

According to the embodiment, the manager 540 may determine whether an overload occurs on the basis of the throttling counter 520 and the throttling cancellation counter 530. For example, when a ratio of the value of the throttling cancellation counter 530 to the value of the throttling counter 520 is high, the manager 540 may determine that the overload has occurred, in which the throttling operation cannot be performed after the throttling operation is determined and in which many hibernation operations or many reset operations occur.

When determining that the overload has occurred, the manager 540 turns off, in operation S820, operations for improving the performance of the storage device 100, such as a write booster and a host performance booster (HPB), thereby degrading the performance.

The dummy write or dummy read can be minimally generated by adjusting the performance even in a normal state, and a malfunction of the storage device 100 can be minimized even when the throttling cancellation occurs.

4) Fourth Embodiment

Figure 9:
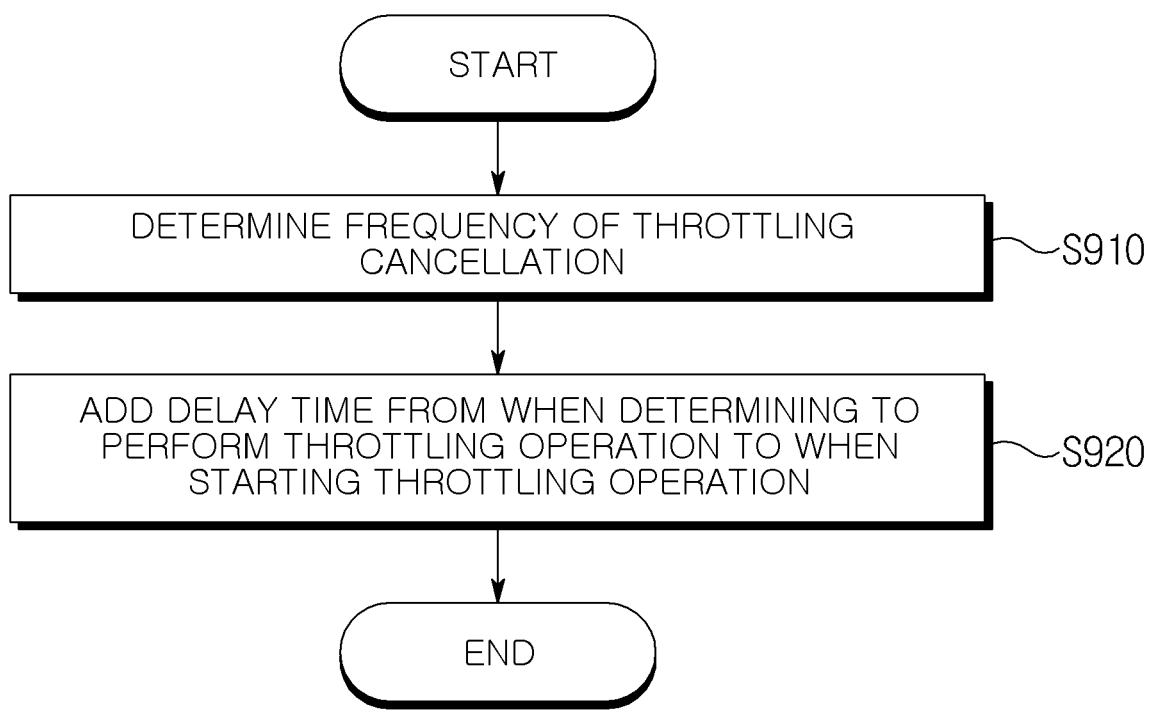
FIG. 9 is a flowchart showing an operation to obtain stability of the storage device by adding a delay time prior to the start of throttling in accordance with a fourth embodiment of the present disclosure.

FIG. 9 is a flowchart showing an operation to obtain stability of the storage device by adding a delay time prior to the start of throttling in accordance with a fourth embodiment of the present disclosure.

In operation S910, the manager 540 may determine the frequency of the throttling cancellation. According to the embodiment, when the value of the throttling cancellation counter 530 is larger than a predetermined value, the manager 540 may determine that the throttling cancellation occurs frequently. Here, the manager 540 may reset the value of the throttling cancellation counter 530 in a regular cycle.

According to another embodiment, when the ratio of the value of the throttling cancellation counter 530 to the value of the throttling counter 520 is higher than a predetermined value, the manager 540 may determine that the throttling cancellation occurs frequently.

When the manager 540 may determine that the throttling cancellation occurs frequently, the manager 540 may add, in operation S920, a delay time from when determining to perform the throttling operation to when starting the throttling operation. Here, the delay time may be a time from when determining to perform the throttling operation to when actually starting the throttling operation. According to the embodiment, the delay time may increase in proportion to the value of the throttling cancellation counter 530. According to another embodiment, the delay time may be constant regardless of the value of the throttling cancellation counter 530.

Since the cancellation of the throttling operation due to the hibernation operation or reset operation is highly likely to occur within the delay time, the stability of the storage device 100 can be improved.

5) Fifth Embodiment

Figure 10:
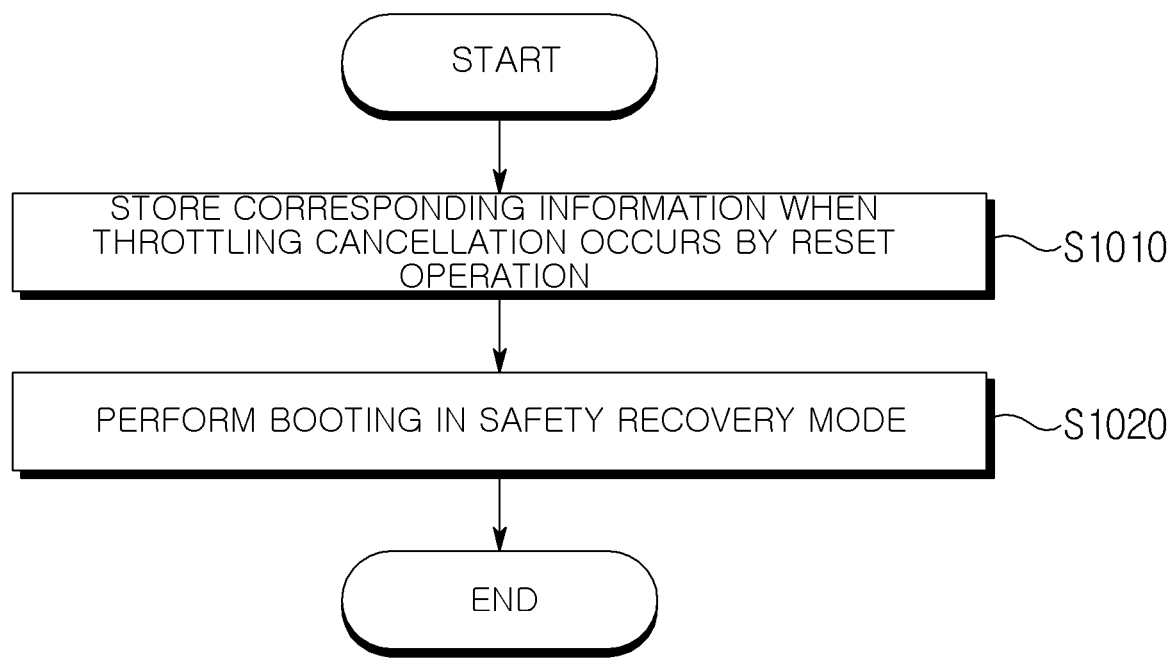
FIG. 10 is a flowchart showing an operation to control such that booting is performed in a safety recovery mode, when the throttling cancellation occurs due to the reset operation in accordance with a fifth embodiment of the present disclosure.

FIG. 10 is a flowchart showing an operation to control such that booting is performed in a safety recovery mode, when the throttling cancellation occurs due to the reset operation in accordance with a fifth embodiment of the present disclosure.

When the throttling cancellation occurs by the reset operation, the environment of the memory 110 is poor enough to start the throttling operation (high temperature environment). Therefore, there is a need to perform booting in the safety recovery mode in consideration of such an environment when booting is performed after the reset operation. That is, if normal booting is performed by determining that the reset operation is the same as the reset operation in a normal environment, booting may not be performed normally and errors may occur because a harsh environment with very high temperature or very low temperature is not considered.

In operation S1010, when the throttling cancellation occurs by the reset operation, the manager 540 may store corresponding information in the memory 110.

In operation S1020, when the storage device 100 obtains the corresponding information while performing the booting process, and determines that booting occurs after the throttling cancellation occurs by the reset operation, the storage device 100 may perform booting in the safety recovery mode. According to the embodiment, while an operation method of the memory 110 during the normal booting may have a double data rate (DDR), the operation method of the memory 110 in the safety recovery mode may have a single data rate (SDR). According to another embodiment, the operating frequency of the memory 110 in the safety recovery mode may be lower than the operating frequency of the memory 110 during the normal booting.

The present disclosure proposes the operation of the storage device 100 in order to solve various problems caused by the throttling cancellation. Based on the operations proposed in the present disclosure, the storage device 100 is highly likely to operate normally without a malfunction even in a poor environment that causes the throttling operation.

According to various embodiments of the present disclosure, it is possible to reduce the possibility of a malfunction of the storage device by controlling the cancellation operation such as a hibernation operation or a reset operation and the throttling operation such that they do not overlap as much as possible.

Further, according to various embodiments of the present disclosure, an environment and conditions are set in such a way that the hibernation operation or reset operation can be stably performed, and further a more stable operating environment of the storage device can be created by using the throttling operation.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations may not be performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. An operation method of a memory controller, the method comprising:
    determining a temperature of a memory;
    determining, based on the temperature of the memory, to initiate a throttling operation that reduces performance of the memory;
    increasing a throttling counter by 1 each time a determination to initiate a throttling operation that reduces performance of the memory is made;
    increasing a throttling cancellation counter by 1 each time the throttling operation is interrupted;
    determining whether the throttling operation is interrupted before normally finishing the throttling operation; and
    in response to determining that the throttling operation is interrupted, performing a throttling recovery operation, which reduces an interruption of the throttling operation, based on a value of the throttling counter and a value of the throttling cancellation counter.

2. The operation method of claim 1,
    wherein the determining whether the throttling operation is interrupted comprises detecting a first temperature at which the throttling operation is frequently interrupted, and
    wherein the performing the throttling recovery operation comprises setting a temperature condition for the determining to initiate the throttling operation to be lower than the first temperature by a predetermined temperature.

3. The operation method of claim 2, wherein the detecting the first temperature comprises detecting, as the first temperature, a currently set temperature condition for the determining to initiate the throttling operation when a ratio of a value of a throttling cancellation counter to a value of a throttling counter is larger than a predetermined value.

4. The operation method of claim 2, wherein the detecting the first temperature comprises detecting the first temperature based on statistical values of temperatures of the memory determined at a plurality of points of time when the throttling operation is interrupted.

5. The operation method of claim 1,
    wherein the determining whether the throttling operation is interrupted comprises increasing a throttling cancellation counter by 1 when the throttling operation is interrupted, and
    wherein the performing the throttling recovery operation comprises:
        resetting a storage device including the memory and the memory controller when a value of the throttling cancellation counter is greater than or equal to a predetermined value; and
        initializing the value of the throttling cancellation counter to 0.

6. The operation method of claim 5, wherein the performing the throttling recovery operation further comprises transmitting, to a first outside, information indicating that the memory and the memory controller are to be reset.

7. The operation method of claim 5, wherein the resetting comprises resetting the storage device during an idle state where there is no command from a first outside or during a hibernation operation.

8. The operation method of claim 1,
    wherein the determining whether the throttling operation is interrupted comprises determining that an overload has occurred when a ratio of a value of a throttling cancellation counter, which is increased by 1 each time the throttling operation is interrupted before the throttling operation is initiated after the determining to initiate the throttling operation, to a value of a throttling counter, which is increased by 1 each time of the determining to initiate the throttling operation is larger than a predetermined value, and
    wherein the performing the throttling recovery operation comprises turning off, when determining that the overload has occurred, operations of a write booster and a host performance booster (HPB) for improving performance of a storage device including the memory and the memory controller.

9. The operation method of claim 1,
    wherein the determining whether the throttling operation is interrupted comprises determining whether a ratio of a value of a throttling cancellation counter, which is increased by 1 each time the throttling operation is interrupted before the throttling operation is initiated after the determining to initiate the throttling operation, to a value of a throttling counter, which is increased by 1 each time of the determining to initiate the throttling operation is larger than a predetermined value, and
    wherein the performing the throttling recovery operation comprises setting, when the ratio is greater than the predetermined value, the throttling operation to be initiated after a predetermined delay time after the determining to initiate the throttling operation.

10. The operation method of claim 9, wherein the delay time increases in proportion to a number of times the throttling operation is interrupted.

11. The operation method of claim 1,
    wherein the determining whether the throttling operation is interrupted comprises determining whether the throttling operation is interrupted by a reset operation, and
    wherein the performing the throttling recovery operation comprises:
        storing, in the memory, information indicating that the throttling operation is interrupted by the reset operation when it is determined that the throttling operation is interrupted by the reset operation;
        determining, based on the information when booting of a storage device is performed after the reset operation, whether the throttling operation is interrupted by the reset operation; and
        performing, when it is determined that the throttling operation is interrupted by the reset operation, the booting in a safety recovery mode in which the memory is operated at an operating frequency lower than a normal mode.

12. A memory controller comprising:
a temperature acquirer configured to determine a temperature of a memory;
a throttling counter configured to increase by 1 each time a determination to initiate a throttling operation that reduces performance of the memory is made;
a throttling cancellation counter configured to increase by 1 each time the throttling operation is interrupted; and
a manager configured to:
determine, based on the temperature of the memory, to initiate the throttling operation,
determine whether the throttling operation is interrupted before normally finishing the throttling operation, and
in response to determining that the throttling operation is interrupted, perform a throttling recovery operation that reduces an interruption of the throttling operation based on a value of the throttling counter, and a value of the throttling cancellation counter.

13. The memory controller of claim 12, wherein the manager is further configured to:
detect a first temperature at which the throttling operation is frequently interrupted, and
set a temperature condition for the determination to initiate the throttling operation to be lower than the first temperature by a predetermined temperature.

14. The memory controller of claim 13,
wherein the manager detects, as the first temperature, a currently set temperature condition for the determination to initiate the throttling operation when a ratio of the value of the throttling cancellation counter to the value of the throttling counter is greater than a predetermined value, or
wherein the manager detects the first temperature based on statistical values of temperatures of the memory determined by the temperature acquirer at a plurality of points of time when the throttling cancellation counter is increased by 1.

15. The memory controller of claim 12, wherein the manager is further configured to control a storage device including the memory and the memory controller to be reset when the value of the throttling cancellation counter is greater than or equal to a predetermined value.

16. The memory controller of claim 12, wherein the manager is further configured to:
control a storage device including the memory and the memory controller to be reset when the value of the throttling cancellation counter is greater than or equal to a predetermined value, and
initialize the value of the throttling cancellation counter to 0.

17. The memory controller of claim 12, wherein the manager is further configured to turn off operations of a write booster and a host performance booster (HPB) for improving performance of a storage device including the memory and the memory controller when a ratio of the value of the throttling cancellation counter to the value of the throttling counter is greater than a predetermined value.

18. The memory controller of claim 12, wherein the manager is further configured to set the throttling operation to be initiated after a predetermined delay time after the determination to initiate the throttling operation when a ratio of the value of the throttling cancellation counter to the value of the throttling counter is greater than a predetermined value.

19. The memory controller of claim 12, wherein, when the throttling operation is interrupted by a reset operation, the manager is further configured to:
store, in the memory, information indicating that the throttling operation is interrupted by the reset operation, and
control, after the reset operation, booting of the memory controller to be performed in a safety recovery mode in which the memory is operated at an operating frequency lower than a normal mode.

20. A storage device comprising:
a memory equipped with a temperature sensor; and
a memory controller comprising:
a temperature acquirer configured to determine a temperature of a memory;
a throttling counter configured to increase by 1 each time a determination to initiate a throttling operation that reduces performance of the memory is made;
a throttling cancellation counter configured to increase by 1 each time the throttling operation is interrupted; and
a manager configured to:
determine, based on a temperature of the memory, to initiate a throttling operation that reduces performance of the memory;
determine whether the throttling operation is interrupted before normally finishing the throttling operation; and
in response to determining that the throttling operation is interrupted, perform a throttling recovery operation that reduces an interruption of the throttling operation based on a value of the throttling counter, and a value of the throttling cancellation counter.

* * * * *